United States Patent [19]
Klatt

[11] Patent Number: 4,634,950
[45] Date of Patent: Jan. 6, 1987

[54] ELECTRIC APPARATUS

[76] Inventor: Frederick W. Klatt, 36 Ripley Rd., Medford, Mass. 02155

[21] Appl. No.: 626,696

[22] Filed: Jul. 2, 1984

Related U.S. Application Data

[63] Continuation-in-part of Ser. No. 380,052, May 20, 1982, Pat. No. 4,459,530.

[51] Int. Cl.$^4$ .............................................. H02P 5/34
[52] U.S. Cl. .................................. 318/732; 318/705; 318/737
[58] Field of Search ............... 318/715, 737, 731, 732, 318/705, 49, 140, 154, 148, 146–147, 153; 310/102 R, 111, 112

[56] References Cited

U.S. PATENT DOCUMENTS

| | | | |
|---|---|---|---|
| 3,017,553 | 1/1962 | Homan | 318/737 |
| 3,621,350 | 11/1971 | Masterman | 318/722 |
| 4,445,081 | 4/1984 | Kalman | 318/737 X |
| 4,459,530 | 7/1984 | Klatl | 318/732 |
| 4,476,424 | 10/1984 | Kalman | 318/832 |

*Primary Examiner*—William M. Shoop, Jr.
*Assistant Examiner*—Patrick C. Keane
*Attorney, Agent, or Firm*—Wolf, Greenfield & Sacks

[57] ABSTRACT

An electric machine which is adapted to function as a motor or generator without any major electrical or mechanical modifications and conforms to conventional electric machine manufacturing practices. This machine has associated therewith, microprocessor controls. There is provided two balanced phase synchronous electrical machines whose moving windings are attached to a common carrier and whose stationary windings are attached to a common body. One of the two balanced phase electric machines is electrically and mechanically designed to be a balanced phase synchronous power motor or power generator at the utility frequency while the other balanced phase electric machine is electrically and mechanically designed for a higher frequency. The high frequency electric machine is driven by a modulated high frequency signal whose modulation frequency is equal to the utility frequency. The resulting signal transformed on to the moving windings of the high frequency electric machine, which now includes the velocity and displacement frequency component of the common carrier, drives the moving windings of the power motor or generator electric machine after it is demodulated of its high frequency component. As a result, the developed magnetic field on the moving windings of the power motor or generator electric machine will always be synchronized to the magnetic field developed on the stationary windings of the power motor or generator electric machine.

Inherent in the invention is a means to convert mechanical displacement and velocity into an electrical signal. A transducer or any combination of transducers which propagates energy using an electric field, a magnetic field, an electromagnetic field, or a light field implements the communication between the moving apparatus and stationary apparatus without electrical wires connected between them. As a result, by controlling the phase, amplitude, and frequency of the modulation signal with the microprocessor controls, numerous motor and generator functions can be achieved. The principles described herein also apply to electric linear machines appropriately resulting in designating the electric machine of this invention as the Advanced Programmable Electric Motion Machine or APEMM.

81 Claims, 6 Drawing Figures

ELECTRIC APPARATUS

RELATED APPLICATION

This is a continuation-in-part of application Ser. No. 380,052 filed May 20, 1982 now U.S. Pat. No. 4,459,530.

PRIOR ART

U.S. Pat. Nos. 3,467,844; 3,239,701 and 3,956,629 disclose basic synchronous machines in which the rotor of the motor is supplied with a D.C. supply so as to avoid slip rings and brushes but allowing synchronous operation only at one speed.

In prior patents where they do employ a second rotor/stator combination, it is generally not multiphase and is generally rectified to supply D.C. to the rotor; a purpose in which a permanent magnet would suffice. U.S. Pat. No. 3,383,532 has generator section whose axle is separate from the motor section. U.S. Pat. No. 3,383,532 uses a centrifugal movement of a liquid metal such as mercury to change the operating characteristics of the machine.

OBJECTS OF THE INVENTION

One object of the present invention is to provide an improved electric rotating machine which is readily adapted for use either as an electric motor or electric generator without requiring any major mechanical or electromechanical alterations to switch from motoring to generating.

Another object of the present invention is to provide an improved electric rotating machine which readily provides for either motor or generator operation requiring only minor electronic control circuit alterations or software program alterations to bring about such changes between motoring and generating operation.

A further object of the present invention is to provide an improved synchronous rotating machine that is readily adapted to operate on conventional power line frequency say from D.C. to 400 Hertz which furthermore is operable as a generator designed to develop any conventional line frequency.

Still another object of the present invention is to provide an improved electric rotating machine which operates as a motor in which the rpm and power factor can be easily varied and controlled.

Still a further object of the present invention is to provide an improved electric rotating machine having a power factor of 1 in which the current is in phase with the voltage which is an important consideration for a motor efficiency.

Another object of the present invention is to provide an improved electric rotating machine in which in operation as a motor the rotating machine has control over its angular displacement.

A further object of the present invention is to provide an improved electric rotating machine that does not require any brushes or slip rings and which is particularly adapted for applications such as in electric cars and boats, electro magnetic transmissions, and wind mills.

Still another object of the present invention is to provide an improved electric rotating machine which operates so as to provide synchronous operation over a range of speeds.

A further object of the present invention is to provide an improved electric machine that may be in the form of either an electric rotational machine or an electric linear machine.

BRIEF DESCRIPTIONS OF THE DRAWINGS

Numerous other objects, features and advantages of the invention should now become apparent upon a reading of the followind detailed description taken in conjunction with the accompanying drawing, in which:

FIG. 3A portrays a two phase system in accordance with the present invention including a permanent magnet arrangement.

THE INVENTION

The present invention relates in general to an electric rotating apparatus or machine, and pertains more particularly to an electric rotating machine which may be in the form of either an electric motor or an electric generator and which is particularly adapted for complimentary use with an electronic controller or microprocessor for the control of certain parameters of the electric rotating machine. In accordance with the invention the control results in efficient and optimum motor or generator operation. The preferred embodiment of the invention is constructed employing synchronous rotating machine concepts. Although the embodiment described herein is in the form of an electric rotational machine, it is understood that the principles of the present invention are similarly applied to electric linear machines. A discussion is filed hereinafter with regard to electric linear machines.

A synchronous rotating machine or apparatus is known to be very efficient at a singular angular velocity referred to as the synchronous speed. A synchronous rotating machine has a stationary winding called the stator winding and a rotating winding called a rotor winding. In general, there is one stator winding for each phase of the electrical power supplied to the stator. Also, there is one rotor winding for each phase.

By way of example consideration is now given to a balanced two phase machine in which the drive voltages and current amplitudes of each phase are equal and the drive voltage and current phases are equally spaced in time. Although a two phase machine is considered it is understood that principles may also be applied in single phase or balanced multiple phase electric power machines.

Figure 1:
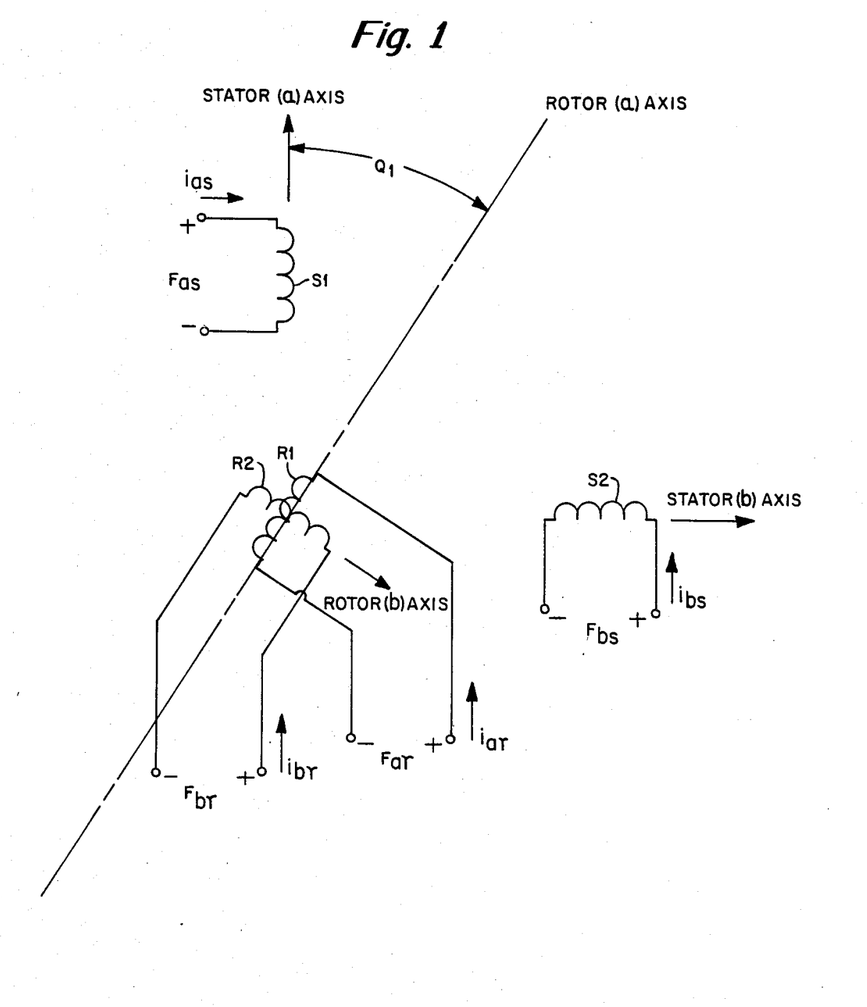
FIG. 1 schematically illustrates a balanced two-phase synchronous rotating machine with a pair of stator windings and a pair of rotor windings.

The mathematical relations for the balanced two phase machine illustrated in FIG. 1 are:

$$F_{as} = L_s I_{as} + M I_{ar} \cos Q - M I_{br} \sin Q \quad \text{(equ. 1)}$$

$$F_{bs} = L_s I_{bs} + M I_{ar} \sin Q + M I_{br} \cos Q \quad \text{(equ. 2)}$$

$$F_{ar} = L_r I_{ar} + M I_{as} \cos Q + M I_{bs} \sin Q \quad \text{(equ. 3)}$$

$$F_{br} = L_r I_{br} - M I_{as} \sin Q + M I_{bs} \cos Q \quad \text{(equ. 4)}$$

$$T_e = M[(I_{ar}I_{bs} - I_{br}I_{as}) \cos Q - (I_{ar}I_{as} + I_{br}I_{bs}) \sin Q] \quad \text{(equ. 5)}$$

where:

$L_s$ = inductance of each of the stator windings,
$L_r$ = inductance of each of the rotor windings,
M = Mutual inductance between the stator and rotor windings,
$F_{as,ar,bs,br}$ = magnetic flux of the windings, also;

$$Q = w_n t + Q_1 \quad \text{(equ. 6)}$$

where:

$w_n$ = angular velocity of the rotor magnetic axis relative to the stator magnetic axis,
$Q_1$ = angular displacement of the rotor magnetic axis relative to the stator magnetic axis at time, t=0
t = time
$T_e$ = torque As indicated in FIG. 1, there are a pair of stator windings S1 and S2 and a pair of rotor windings R1 and R2. Let it be assumed that the stator and rotor windings are excited with balanced two phased current sources 90° apart. In this case the following equations apply.

$$I_{as} = I_s \cos w_s t,$$

$$I_{bs} = I_s \sin w_s t,$$

$$I_{ar} = I_r \cos w_r t,$$

$$I_{br} = I_r \sin w_r t.$$

where:

$w_r$ = electrical angular frequency of the signal applied to the rotor,
$w_s$ = electrical angular frequency of the signal applied to the stator.

Using the above current expressions along with solving the foregoing equations 1–5, results in the following mathematical relations:

$$F_{as} = L_s I_s \cos w_s t + M I_r \cos [(w_r + w_n)t + Q_1], \quad \text{(equ. 7)}$$

$$F_{bs} = L_s I_s \sin w_s t + M I_r \sin [(w_r + w_n)t + Q_1], \quad \text{(equ. 8)}$$

$$F_{ar} = L_r I_r \cos w_r t + M I_s \cos [(w_s - w_n)t - Q_1], \quad \text{(equ. 9)}$$

$$F_{br} = L I_r \sin w_r t + M I_s \sin [(w_s - w_n)t - Q_1], \quad \text{(equ. 10)}$$

$$T_e = -M I_r I_s \sin [(w_n - w_s + w_r)t + Q_1], \quad \text{(equ. 11)}$$

Now, from equation 11 it can be seen that the average torque results only if:

$$w_n = w_s(+/-) w_r,$$

or $$(w_n - w_s + w_r) = 0, \quad \text{(equ. 12)}$$

or $$T_e = -M I_r I_s \sin Q_1 \quad \text{(equ. 12a)}$$

Thus, if the relationship of equation 12 holds and furthermore if $Q_1 = 90°$, then the torque is maximum or equal to $M I_r I_s$. When equation 12 is satisfied the voltage relations of the stator voltages (voltage=dF/dt) are as follows:

$$V_{as} = -[w_s L_s I_s \sin w_s t + w_s M I_r \sin (w_s t + Q_1)] \quad \text{(equ. 13)}$$

$$V_{bs} = w_s L_s I_s \cos w_s t + w_s M I_r \cos (w_s + Q_1) \quad \text{(equ. 14)}$$

Also, the rotor voltage are given by the following equations:

$$V_{ar} = -[w_r L_r I_r \sin w_r t + w_r M I_s \sin (w_r - Q_1)] \quad \text{(equ. 15)}$$

$$V_{br} = w_r L_r I_r \cos w_r t + w_r M I_s \cos (w_r t - Q_1) \quad \text{(equ. 16)}$$

From the above equation then in particular equation 12, it can be seen that the synchronous rotating machine functions as a very efficient motor or generator at a given speed ($w_n$) by supplying D.C. current to the rotor winding so that $w_r=0$, and A.C. current is applied to the stator winding. This has the effect of reducing equation 12 to the following equation:

$$W_n = w_s$$

This equation essentially expresses that the mechanical angular velocity of the rotor is equated to the electrical angular frequency applied to the rotor and if balanced polyphased currents of constant frequency are supplied to the stator windings and if the axial rotational speed is varied, then balanced polyphased rotor currents of variable frequency would have to be supplied to satisfy equation 12.

Another interesting characteristic of the balanced phase electric machine of FIG. 1 is its capability to transduce the mechanical displacement and speed of the rotor relative to the stator. Each of the equations 13, 14, 15 and 16 are composed of two current components. One component is due to the rotor current, $I_r$, and the other component is due to the stator current, $I_s$. Letting $I_r = 0$ and $I_s \neq 0$ then:

$$V_{as} = -w_s L_s I_s \sin w_s t$$

$$V_{bs} = w_s L_s I_s \cos w_s t$$

$$V_{ar} = -w_r M I_s \sin (w_r t - Q_1)$$

$$V_{br} = -w_r M I_s \cos (w_r t - Q_1)$$

Upon analyzing these equations, it is easily proven that there is a phase shift in time of $(w_n t + Q_1)$ between the rotor and stator voltages if equation 12 is satisfied.

Likewise, if $I_s = 0$ and $I_r \neq 0$, then it is easily proven that there is a similar phase shift in time of $(w_n t + Q_1)$ between the rotor and stator voltages.

By earlier definition, the mechanical displacement between the rotor and stator at any given time was $(w_n t + Q_1)$. Since both components are phase shifted in time by $(w_n t + Q_1)$ then by the laws of superposition, the sum of the components ($I_s \neq 0$, $I_r \neq 0$) are shifted by $(w_n t + Q_1)$. In conclusion, the difference in phase shift between the stator voltage and the rotor voltage is proportionally equal to the relative mechanical displacement in time between the rotor and stator.

In conventional electrical power utilities which have balanced polyphase sinusoidal sources of constant frequency (60 Hertz in the United States), the design of balanced polyphase sources of variable frequency to power the rotor for variable axial speeds is energy wasteful and economically prohibitive. Therefore, synchronous motors in industry essentially have no starting torque but are externally rotated to synchronous speed wherein the aforementioned equation 12 is satisfied and torque prevails.

In synchronous rotating machines, if the mechanical rotation is zero ($W_n = 0$), the synchronous rotating machine appears to be a true electrical transformer where $W_r = W_s$. However, the torque equation is satisfied and torque exists between the stator and motor windings.

In a synchronous rotating machine as illustrated in FIG. 1, if a power source of constant frequency is applied to the stator and if the angular rotation of the axle is varied from 0 rpm to synchronous speed, then the frequency of the rotor current is varied from $W_s$ to 0 (D.C.) hertz respectively, thus satisfying equation 12. In this instance the torque to rotate the axle is dependent on the mutual inductance and the polyphase current magnitudes.

As the parameter $Q_1$ which is the angular displacement of the rotor with reference to the stator, changes to $-Q_1$, the torque $(-MI_rI_s \sin(-Q_1))$ becomes positive and the synchronous machine functions as a generator instead of a motor. As the parameter $Q_1$ is varied the currents ($I_{as,bs,ar,br}$) may be in phase, or lead, or lag their respective voltages ($V_{as,bs,ar,br}$). Therefore the A.C. power factor of the synchronous machine is adjustable. Also, if the current amplitudes or voltage amplitudes are varied while maintaining the balanced polyphase concepts, the torque and power factor can be varied.

Now, in accordance with the invention, the electric rotating machine employs two synchronous machines which are attached to the same axial and therefore rotate at the same angular velocity. One of the synchronous machines is referred to herein as a rotor excitation generator (REG) in that it excites the rotor of the second synchronous machine with the proper frequency to satisfy electrical rotation. The second synchronous machine is referred to as a power motor/generator (PGM) because it actually supplies the positive or negative mechanical power.

The terminology, synchronous, was used for each of the two attached electric machines of this invention to suggest their adherence to the previous mathematical equations; particularly, equ. 12.

Figure 2:
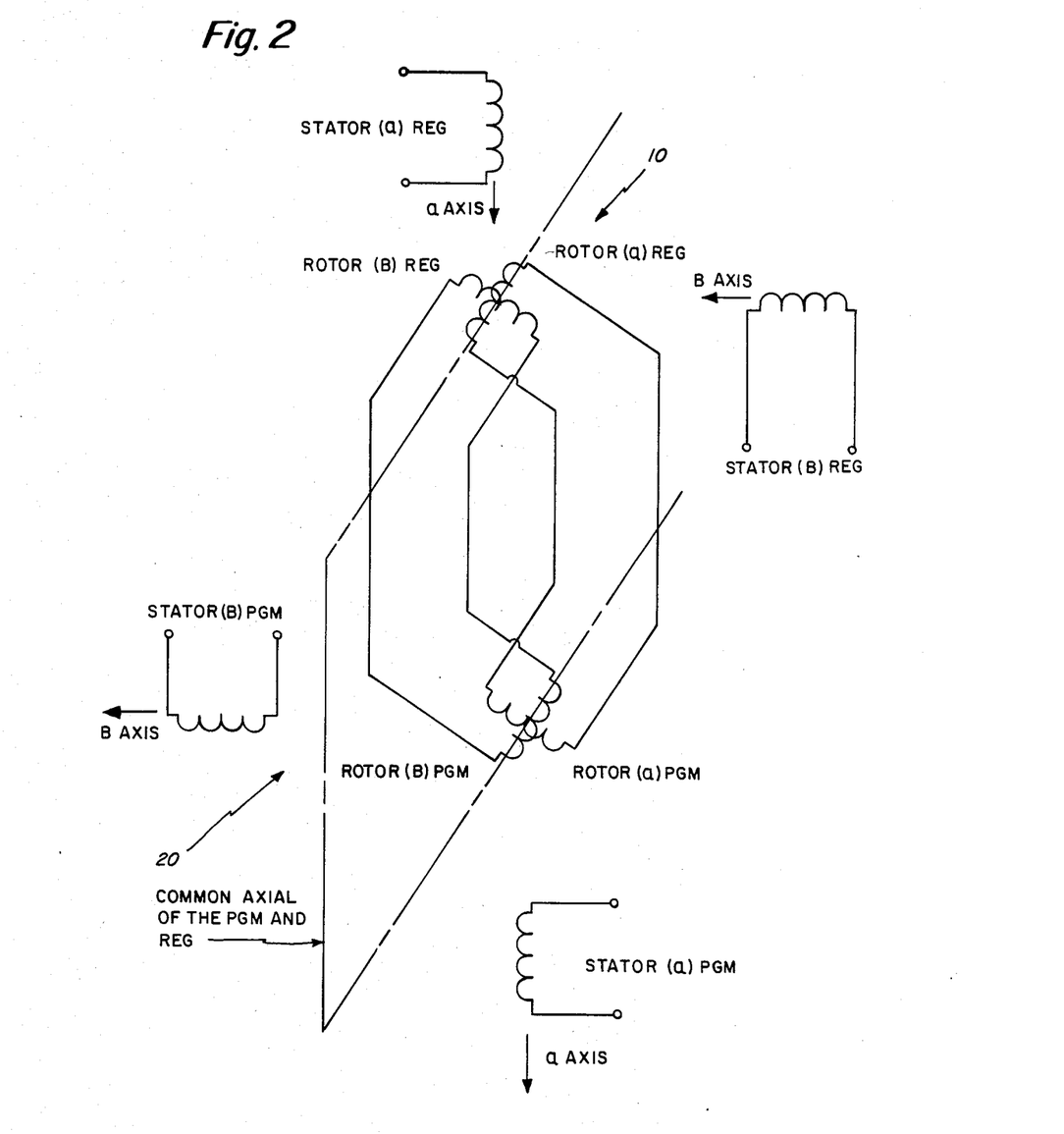
FIG. 2 schematically represents the concepts of the present invention employing two synchronous machines including a rotor excitation generator and a power motor/generator.

For a better understanding of the principles of the invention reference is now made to FIG. 2 which shows both of the synchronous machines 10 and 20. The machine 10 is the aforementioned rotor excitation generator (REG). The machine 20 is the aforementioned power motor/generator (PGM). If the stator winding of both the rotor excitation generator and the power motor/generator are supplied with the same frequency ($W_s$), the relationship expressed in equation 12 is always satisfied for both REG 10 and PGM 20, even if no rotation of the axle exists. As the mechanical angular velocity of the rotor increases the rotor excitation generator supplies a frequency of:

$$W_{sREG} - W_{nREG} = W_{rREG}$$

The above frequency is supplied from the rotor winding to the power motor/generator rotor winding, thereby satisfying the relationship:

$$(W_{sPGM} - W_{nREG} = W_{rPGM} = W_{rREG});$$

$$W_{nPMG} = W_{nREG}; \quad W_{sPGM} = W_{sREG}$$

Essentially, the power motor/generator (PMG) is fooled into believing it is turning at the proper speed for synchronous operation. As ($W_n$) approaches ($W_s$) then ($W_r$) approaches zero and the rotor excitation generator supplies D.C. to the power motor/generator.

The voltage amplitude is constant in all A.C. utility power line applications. Thus, the inductance and mutual inductance of both the rotor excitation generator and the power motor/generator have to be equal because the currents are to be balanced polyphase currents in order to satisfy the forementioned equations. As a result no substantial external useful mechanical torque is developed because:

$$Te_{PGM} = -Te_{REG}$$

Essentially, the arrangement functions as a power transformer.

Since the current or voltage amplitudes are to be balanced, then in accordance with equation 12A, only the mutual inductance of the REG can be decreased to reduce the torque of the REG.

In order to provide the useful mechanical torque there is employed in accordance with the invention a modulated high frequency power source whose carrier frequency is orders of magnitude higher than the utility supply frequency. The modulation frequency of this high frequency signal is equal to the frequency of the signal at the PGM stator. This signal is supplied to the stator of the rotor excitation generator. This modulation is preferably a pulse width modulation but could also be amplitude modulation, frequency modulation or other forms of modulation that may be developed from the utility line supply using presently available electronic designs.

Because of the proportionately higher frequency employed in comparison with the frequency of the standard A.C. line, proportionately smaller rotor and stator windings (analogous to lower inductance (L) and lower mutual inductance (M) can be used for the rotor excitation generator with no loss in the magnitudes of the voltage or currents supplied to the power motor/generator, since electro magnetic induction is a function of frequency.

A brief mathematical discussion similar to the earlier discussion using FIG. 1 will follow. Again, it is emphasized that though a two phase example is used, the principles may also be applied in single phase or multiphase electric power machines. All parameters will be referenced to the PGM mechanical and electrical axis.

Let the balanced currents for the PGM be:

$$I_{as(PGM)} = I_{s(PGM)} \cos w_{s(PGM)} t$$

$$I_{bs(PGM)} = I_{s(PGM)} \sin w_{s(PGM)} t$$

$$I_{ar(PGM)} = I_{r(PGM)} \cos (w_{r(PGM)} t + Q_2)$$

$$I_{br(PGM)} = I_{r(PGM)} \sin (w_{r(PGM)} t + Q_2)$$

where:

$w_{r(PGM)}$ is the frequency of the signal applied to the rotor of the PGM $w_{s(PGM)}$ is the frequency of the signal applied to the stator of the PGM $Q_2$ is the phase shift in time between the PGM rotor currents and the PGM stator currents Using the above expressions, satisfying equ. 12, and solving equ. 7, 8, 9, 10, 11, letting:

$$Q_{(PGM)} = w_{n(PGM)}t + Q_{1(PGM)}$$

where:

$w_{n(PGM)}$ = angular velocity of the rotor magnetic axis of the PGM relative to the stator magnetic axis of the PGM, $Q_{1(PGM)}$ = angular displacement of the rotor magnetic axis of the PGM relative to the stator magnetic axis of the PGM at time, t=0

Then the rotor and stator voltages of the PGM and the torque of the PGM are:

$$V_{as(PGM)} = -[w_{s(PGM)}L_{s(PGM)}I_{s(PGM)}\sin w_{s(PGM)}t + w_{s(PGM)}M_{(PGM)}I_{r(PGM)}\sin w_{s(PGM)}t + Q_{1(PGM)} + Q_2)] \quad \text{(equ. 17)}$$

$$V_{bs(PGM)} = w_{s(PGM)}L_{s(PGM)}I_{s(PGM)}\cos w_{s(PGM)}t + w_{s(PGM)}M_{(PGM)}I_{r(PGM)}\cos (w_{s(PGM)}t + Q_{1(PGM)} + Q_2) \quad \text{(equ. 18)}$$

$$V_{ar(PGM)} = -[w_{r(PGM)}L_{r(PGM)}I_{r(PGM)}\sin (w_{r(PGM)}t + Q_2) + w_{r(PGM)}M_{(PGM)}I_{s(PGM)}\sin (w_{r(PGM)}t - Q_{1(PGM)})] \quad \text{(equ. 19)}$$

$$V_{br(PGM)} = w_{r(PGM)}L_{r(PGM)}I_{r(PGM)}\cos (w_{r(PGM)}t + Q_2) + w_{r(PGM)}M_{(PGM)}I_{s(PGM)}\cos (w_{r(PGM)}t - Q_{1(PGM)}) \quad \text{(equ. 20)}$$

$$T_{e(PGM)} = -M_{(PGM)}I_{r(PGM)}I_{s(PGM)}\sin (Q_{1(PGM)} + Q_2) \quad \text{(equ. 20)}$$

Let the balanced stator currents of the Rotor Excitation Generator (REG) be:

$$I_{as(REG)} = I_{s(REG)}\sin w_1 t \cos (w_{s(REG)}t + Q_3)$$

$$I_{bs(REG)} = I_{s(REG)}\sin w_1 t \sin (w_{s(REG)}t + Q_3)$$

where:

$Q_3$ is the phase difference in time between the REG stator currents and the PGM STATOR CURRENTS, and in accordance with this invention, the demodulated currents of the REG motor drive the PGM rotor so by Kirchhoff Current Law the demodulated REG rotor currents must be equal to the PGM rotor currents:

$$I_{ar(PGM)} + I_{ar(REG)} = 0$$

$$I_{br(PGM)} + I_{br(REG)} = 0$$

then the REG rotor currents are:

$$I_{ar(REG)} = -I_{r(PGM)}\sin w_1 t \cos (w_{r(REG)}t + Q_2)$$

$$I_{br(REG)} = -I_{r(PGM)}\sin w_1 t \sin (w_{r(REG)}t + Q_2)$$

where:

$w_{s(REG)}$ is the frequency of modulation of the signal applied to the REG stator $w_{r(REG)}$ is the frequency of modulation of the signal applied to the REG rotor $w_1$ is the high frequency carrier of the modulation of both signals.

$w_1 >> w_{s(REG)} = w_{s(PGM)}$; by definition of the invention.

Also note that the REG rotor currents are 180° out of phase from the PGM rotor currents.

Using the above equations for REG currents, satisfying equ. 12 and solving equ. 7, 8, 9, 10, 11, letting:

$$Q_{(REG)} = w_{n(REG)}t + Q_{1(REG)}$$

where:

$w_{n(REG)}$ = angular velocity of the rotor magnetic axis of the REG relative to the stator magnetic axis of the REG, $Q_{1(REG)}$ = angular displacement of the rotor magnetic axis of the REG relative to the stator magnetic axis of the REG at time, t=0 and the angular displacement between the REG stator axis and the PGM stator axis is 0° then the rotor and stator voltages of the REG and the torque of the REG are:

(equ. 22)

$$V_{as(REG)} = \sin w_1[-[w_{s(REG)}L_{s(REG)}I_{s(REG)}\sin(w_{s(REG)}t + Q_3) - M_{REG}I_{r(PGM)}w_{s(REG)}\sin(w_{s(REG)}t + Q_{1(REG)} + Q_2)]] + w_1\cos w_1 t[L_{s(REG)}I_{s(REG)}\cos(w_{s(REG)}t + Q_3) - M_{REG}I_{r(PGM)}\cos(w_{s(REG)}t + Q_{1(REG)} + Q_2)]$$

$$V_{bs(REG)} = \sin w_1[w_{s(REG)}L_{s(REG)}I_{s(REG)}\cos(w_{s(REG)}t + Q_3) - M_{REG}I_{r(PGM)}w_{s(REG)}\cos(w_{s(REG)}t + Q_{1(REG)} + Q_2)] + w_1\cos w_1 t[L_{s(REG)}I_{s(REG)}\sin(w_{s(REG)}t + Q_3) - M_{REG}I_{r(PGM)}\sin(w_{s(REG)}t + Q_{1(REG)} + Q_2)]$$

$$V_{ar(REG)} = \sin w_1[-[-w_{r(REG)}L_{r(REG)}I_{r(PGM)}\sin(w_{r(REG)}t + Q_2) + M_{REG}I_{s(REG)}w_{r(REG)}\sin(w_{r(REG)}t + Q_{1(REG)} - Q_3)]] + w_1\cos w_1 t[-L_{r(REG)}I_{r(PGM)}\cos(w_{r(REG)}t + Q_2) + M_{REG}I_{s(REG)}\cos(w_{r(REG)}t - Q_{1(REG)} + Q_3)]$$

$$V_{br(REG)} = \sin w_1[-w_{r(REG)}L_{r(REG)}I_{r(PGM)}\cos(w_{r(REG)}t + Q_2) + M_{REG}I_{s(REG)}w_{r(REG)}\cos(w_{r(REG)}t - Q_{1(REG)} + Q_3)] + w_1\cos w_1 t[-L_{r(REG)}I_{r(PGM)}\sin(w_{r(REG)}t + Q_2) + M_{REG}I_{s(REG)}\sin(w_{r(REG)}t - Q_{1(REG)} + Q_3)]$$

$$T_{e(REG)} = M_{REG}\sin^2 w_1 t[I_r I_s \sin(Q_{1(REG)} + Q_2 + Q_3)]$$

As previously mentioned, the criteria for this invention was:

$$w_1 >> w_{s(PGM)} = w_{s(REG)},$$

$$L_{s(REG)} << L_{s(PGM)},$$

$$L_{r(REG)} << L_{r(PGM)},$$

$$M_{REG} << M_{PGM}$$

$$w_{n(REG)} = w_{n(PGM)}$$

As a result, any term for the REG voltages which is multiplied by $w_1$ will be the dominant term. The voltages for the REG now become:

$$V_{as(REG)} = w_1 \cos w_1 t [L_{s(REG)} I_{s(REG)} \cos (w_{s(REG)} t + Q_3) - M_{REG} I_{r(PGM)} \cos (w_{s(REG)} t + Q_{1(REG)} + Q_2)]] \quad \text{(equ. 23)}$$

$$V_{bs(REG)} = w_1 \cos w_1 t [L_{s(REG)} I_{s(REG)} \sin (w_{s(REG)} t + Q_3) - M_{REG} I_{r(PGM)} \sin (w_{s(REG)} t + Q_{1(REG)} + Q_2)] \quad \text{(equ. 24)}$$

$$V_{ar(REG)} = w_1 \cos w_1 t [-L_{r(REG)} I_{r(PGM)} \cos (w_{r(REG)} t + Q_2) + M_{REG} I_{s(REG)} \cos (w_{r(REG)} t - Q_{1(REG)} + Q_3)] \quad \text{(equ. 25)}$$

$$V_{br(REG)} = w_1 \cos w_1 t [-L_{r(REG)} I_{r(PGM)} \sin (w_{r(REG)} t + Q_2) + M_{REG} I_{s(REG)} \sin (w_{r(REG)} t - Q_{1(REG)} + Q_3)] \quad \text{(equ. 26)}$$

After filtering out the high frequency component (cos $w_1$) by demodulation techniques, the previous REG rotor voltage expressions have the same frequency but different phase components as the PGM rotor voltage expressions. If the resistance of the rotor circuit is R, and the REG rotor currents are demodulated, then according to Kirchhoff voltage laws:

$$V_{ar(REG)} - V_{ar(PGM)} = I_{ar(REG)} R = I_{ar(PGM)} R$$

If one expanded this expression, then:

$$-w_1 L_{r(REG)} I_r \cos(w_r t + Q_2) + \quad \text{(equ. 27)}$$

$$w_1 M_{(REG)} I_s \cos(w_r t - Q_{1(REG)} + Q_3) + w_r L_{r(PGM)} I_r \sin(w_r t + Q_2) +$$

$$w_r M_{(PGM)} I_{s(PGM)} \sin(w_r t - Q_{1(PGM)}) = R I_r \cos(w_r t + Q_2)$$

Equation 27 can be expanded into its orthogonal components of sin $w_r t$ and cos $w_r t$. The equation of sin $w_r t$ component will be:

$$+ w_1 L_{r(REG)} I_r \sin Q_2 - \quad \text{(equ. 28)}$$

$$w_1 M_{(REG)} I_{s(REG)} \sin(Q_3 - Q_{1(REG)}) + w_r L_{r(PGM)} I_r \cos Q_2 +$$

$$w_r M_{(PGM)} I_{s(PGM)} \cos(-Q_{1(PGM)}) = -IR_s \sin Q_2$$

The cos $w_r t$ component equation will have similar terms only shifted by 90 degrees so a solution for equation 28 will be a solution for the cos $w_r t$ component.

As a result and in accordance with this invention, by controlling the phase, magnitudes or carrier frequency of the driving voltages of the REG or any of the aforementioned, the REG rotor currents can be varied in phase and magnitude; subsequently, the PGM stator and rotor currents will be controlled. In conclusion, the electrical characteristics of the electric machine can be controlled.

The total torque of the system is equal to $T_{e(PGM)} + T_{e(REG)}$. Upon analyzing the torque equations 21 and 22, the torque of the REG is very much smaller than the torque of the PGM because:

$$M_{REG} << M_{PGM}$$

$$I_{s(REG)} = I_{r(REG)}.$$

As a result, the torque of the system is chiefly due to the torque of the PGM and from our previous analysis the torque of the machine can be controlled by controlling the driving voltages of the REG stator.

The mathematical analysis of this invention used amplitude modulation techniques; however, an analysis using frequency modulation, pulse width modulation, etc. would have similar results.

By modulating the power supply to the stator of the REG and then demodulating the output of the REG by instrinsic means (the inherent filtering capabilities of electrical-mechanical aspects of the motor), or by electronic means (some type of electronic demodulator), the output of the REG rotor looks like an apparent sinusoidal waveform equal to the frequency of the power/motor generator power source. Also, because the windings are small, the inductance and mutual inductance of the windings of the rotor excitation generator will be smaller than the windings of the power motor/generator and therefore, the negative torque of the REG is proportionately smaller than the positive torque of the power generator and the total torque of the system chiefly depends on the power/motor generator:

$$T_{total} = T_{PGM} + T_{REG}; \quad T_{PGM} >> T_{REG}$$

Changing the ($Q_2$) phase of the modulation of the high frequency power source supplied to the rotor excitation generator is analogous to changing the parameter $Q_1$ (the angular displacement between the rotor and stator) of the PGM. Changing the parameter $Q_1$ of the PGM has a impact on the torque and current magnitude, power factor, etc. Changing the frequency of modulation has an impact on the frequency of the A.C. power utility needed for synchronous operation.

Pulse width modulation is a preferable modulation technique because the modulation frequency and the power amplitude may be changed by changing the pulse width and the phase of the modulation cycle may be changed by offsetting the pulses. Developing the modulated frequency for the purpose of this invention may easily be accomplished with todays high power semiconductors and with the use of a microprocessor. As mentioned, specific motor or generator functions can be implemented, by changing the parameters such as frequency, amplitude, phase, etc. of the driving signals of the REG stator. The controlling electronics can only make intelligent decisions on which of these parameters to change, if feedback information such as the rotor mechanical speed, the rotor mechanical displacement and the rotor voltage or current parameters are provided. As discussed earlier, the difference in the phase in time between the rotor voltages and stator voltages indicates the mechanical speed and displacement of the rotor in relation to the stator. It is only necessary to furnish the rotor voltage information signals to the controlling electronics of the electric machine without inhibiting rotor movement by connecting electrical wires.

Now in accordance with this invention, for communication between the rotor and stator, the electric machine of this invention uses light fields, electric fields, magnetic fields, or electromagnetic fields. Transmission and reception of these energy fields are established by transducers which convert electrical signals to the particular field or re-convert the particular field back to the electrical signals. These electrical signals can represent information such as rotor voltage signals and control information. The transducers are of readily available technology, some transducers being of the off-the-shelf variety. The transducers do not exhibit mechanical friction to the moving rotor because their coupling fields are either electric (capacitive), magnetic (electrical transformer), light (optical electronics), or electromagnetic (radio). Any combination of the type of transducers (electric, magnetic, electromagnetic, or light) or multiplicity of transducers can be used.

It is important to physically place the transducer's field implementing parts (the plates of the capacitor of the electric transducer or the windings of an electrical transformer of the magnetic transducer or the light emitting diode and photodetector of the light transducer, etc.) relative to each other to minimize the affects of rotor movement on their fields. It could be necessary to modulate a higher frequency electrical signal driving the transducer with the electrical signal of information or control, using a modulation technique, etc.) which is least effected by rotor movement.

Figure 4:
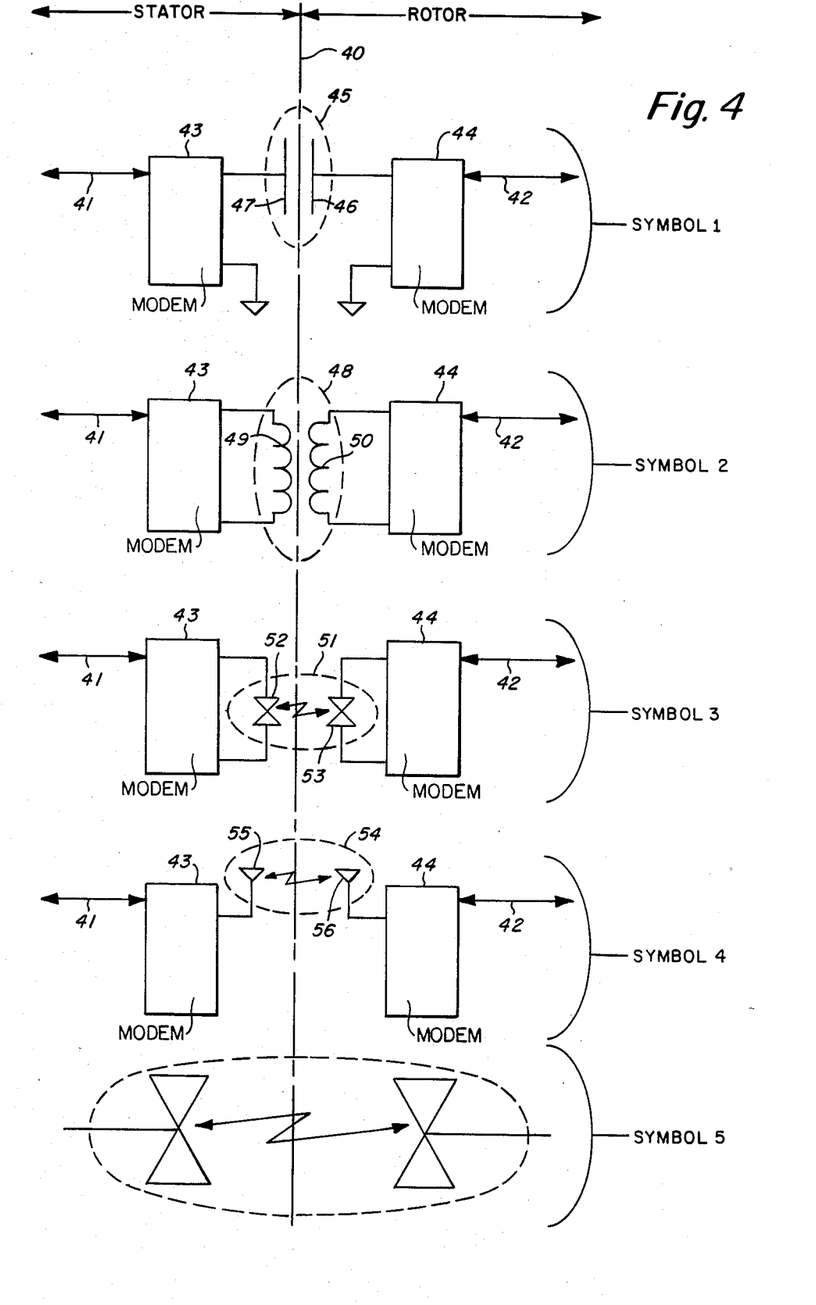
FIG. 4 symbolically displays the possible methods of communication between the rotor and stator without physical connection.

FIG. 4 symbolically shows the means of transducing with their field implementing parts physically split by the air gap between the rotor and stator depicted by a dotted line (40). Symbol 1 shows an electric field type transducer (capacitive) system with its bidirectional electrical input/output port (41) of the stator modulator/demodulator (43) which interfaces to the stator electronics and its bidirectional electrical input/output port (42) of the modulator/demodulator (44) which interfaces to the rotor electronics. The modulator/demodulators or modems (43), (44) optimally modulate the high frequency driving signal of the capacitor (45) with the input signal; likewise, the modem demodulates the response from the capacitor (45) to the original signal. One plate (47) of the capacitor (45) and one modem (43) are stationary and will be referred to as the stationary assembly while the other plate (46) and modem (44) are situated on the rotor and will be referred to as the moving assembly. The electric field is present in the air gap (40) between the two plates of the capacitor.

Symbol 2 shows a magnetic field type transducer (electric transformer) system with the previous mentioned bidirectional input/output port (41), (42), and the two modems (43), (44), but with an electrical transformer (48) instead of the capacitor found in the electric transducer system. The magnetic field type transducer has the added advantage of being able to propogate electrical power as well as information between the stator and rotor. Similar to the electric transducer system, the stationary assembly is composed of the winding (49) of the electrical transformer and one modem (43) while the moving assembly is composed of the other winding (50) and modem (44). The magnetic field is present in the gap (40) between the two windings of the transformer.

Symbol 3 shows a light field type transducer (optoelectronics) system with its optical electronics (51) such as light emitting diodes or lasers and photodetectors. The moving assembly will be composed of a set of optical electronics (53) and modem (44) and the stationary assembly will be composed of a complimentary set of optical electronics (52) and modem (43). The light field is present in the air gap (40) between the two sets of optoelectronics.

Symbol 4 shows an electromagnetic field type transducer (wireless radio) system with its wireless antenna (54). The electromagnetic field is present in the air gap (40) between the two antennae. The moving assembly is composed of one antenna (56) and modem (44) and the stationary assembly is composed of their complimentary set of antennae (55) and modem (43).

Symbol 5 is a custom symbol used latter in this invention to indicate any type or multiplicity of the afore-mentioned transducer systems. It will be referred to as the transducer communication system.

Figure 5:
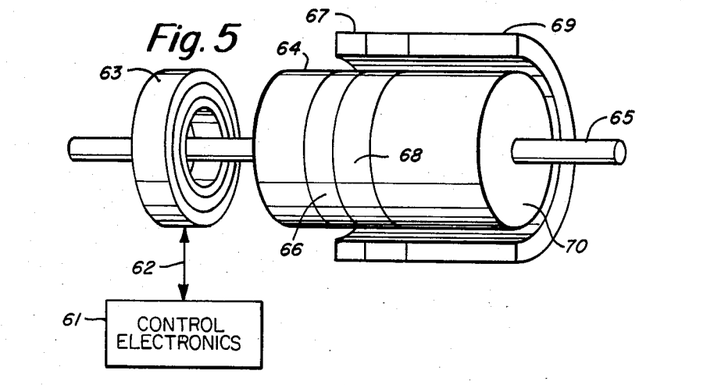
FIG. 5 physically shows a possible implementation of a communication system integrated into the electric machine of this invention.

FIG. 5 shows a physical view of the electric rotating machine invention with the additional arrangement of the communication transducer system. The electric rotating machine control electronics (61) with its microprocessor system is electrically connected (62) to the stationary assembly (63) of the transducer system. Adjunct to the stationary assembly (63) is the moving assembly (64) of the transducer system which is electrically connected to the rotor control electronics (68). The stationary assembly is not attached to the axle (65) of the electric rotating machine and consequently does not rotate with the moving assembly (64) of the transducer. The moving assembly (64) is attached to the axle (65) and rotates with the REG rotor windings (66), the rotor control electronics (68), and the PGM rotor windings (70). The stationary assembly (63) is stationary relative to the stator windings of the REG (67), the stator windings of the PGM (69) and the control electronics (61).

For an example, if the transducer of FIG. 5 was an magnetic field transducer (electrical transformer) system with its secondary and primary windings concentric to the axle, then the magnetic field present between the two windings of the transformer will be perpendicular to the rotation of the rotor. As a result the area of the magnetic field cut by the windings of the electrical transformer will be constant. In essence, the magnetic field will be unaffected by the rotation of the rotor which is an optimum design criteria.

It must be emphasized that there could be many viable deviations from what is shown in FIG. 5. FIG. 5 was only used as one example to clarify the principles. In this connection reference is now made to FIG. 3.

Figure 3:
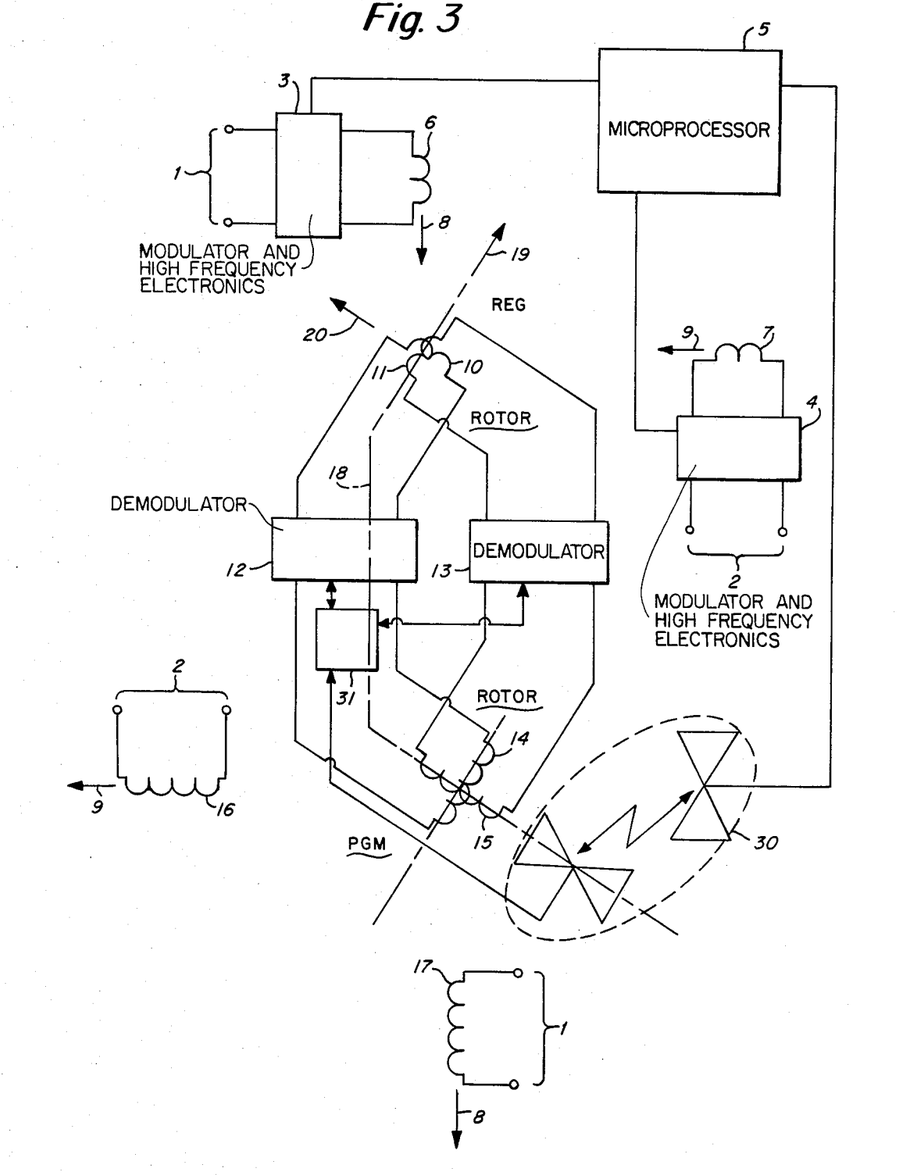
FIG. 3 portrays a two-phase system in accordance with the present invention including a microprocessor and associated controls.

The schematic diagram of FIG. 3 portrays a two phase device. However, it is understood that the principles of the invention may also be applied analogously for polyphase devices.

In FIG. 3, there is described a two phase system in which a first phase is coupled to the input terminals 1 and a second phase coupled to the input terminal 2. The first phase of the electrical power utility is supplied to the modulator and high frequency electronics 3 which in turn drives the stator winding 6 of the rotor excitation generator (REG). The stator winding 6 is associated with the stator axis 8 (axis A). The phase 1 signal at terminal 1 is also shown in FIG. 3 driving the power motor/generator stator winding 17 of the stator axis 8 (axis A).

The second phase of the electrical power utility is supplied to the modulator and high frequency electronics 4 which drives the rotor excitation generator stator winding 7 of the stator axis 9 (axis B). Also, the second phase at terminal 2 is shown directly driving the power generator/motor stator winding 16 of the stator axis 9 (axis B). The phases supplied to the electronic units 3 and 4 are not necessarily used for power but are used as phase indicators for the control electronics. In such an embodiment, the driving electronics to windings 6 and 7 is supplied with DC power converted from the multi-phase source. FIG. 3 also shows the microprocessor 5 which includes related software/firmware (program) and peripheral electronics for controlling the electronic units 3 and 4. The REG stator windings 6 and 7 induce electrical power in the REG rotor winding 11 of the rotor axis 19 (axis A) and also the REG rotor winding 10 of the rotor axis 20 (axis B). Each phase of the induced electrical power directly drives the PGM rotor windings 14 and 15 or, alternatively, each phase may be demodulated by demodulators 12 and 13 either by the intrinsic electromagnetic characteristics of the motor or by the use of an electronic demodulator as depicted in FIG. 3. This electrical power is supplied to the PGM rotor winding 14 of the rotor axis A and the PGM rotor winding 15 of the motor axis B.

The communication transducer system 30 allows the microprocessor system and peripheral electronics 5 to communicate with the rotor control electronics 31 without any electrical wires or physical contacts between the rotor and stator. The moving assembly of the communication transducer system 30 is placed on the rotor and the stationary assembly is placed on the stator in such a way as to optimize the energy field (electric, magnetic, electromagnetic or light) distribution of the transducer; thereby, minimizing the affect on the field distribution due to motion. The rotor controlling electronics is essentially the gateway for electrical signals of information or control, directing these electrical signals to their proper destination. For instance, rotor displacement and velocity information could be directed through the transducer communication system 30 to the microprocessor system and peripheral electronics 5. The controlling signals for the rotor demodulators from the microprocessor system 5 would be directed by the rotor control electronics to the proper demodulator 12 or 13. It is conceivable to have a microprocessor system as part of the rotor control electronics 31 to alleviate some of the intelligence from the microprocessor system 5.

The windings of the PGM and REG rotors and associated equipment are on a common axle 18 and thus rotate at the same speed. It is also noted that the size of the REG windings are smaller than the PGM windings.

Figure 6:
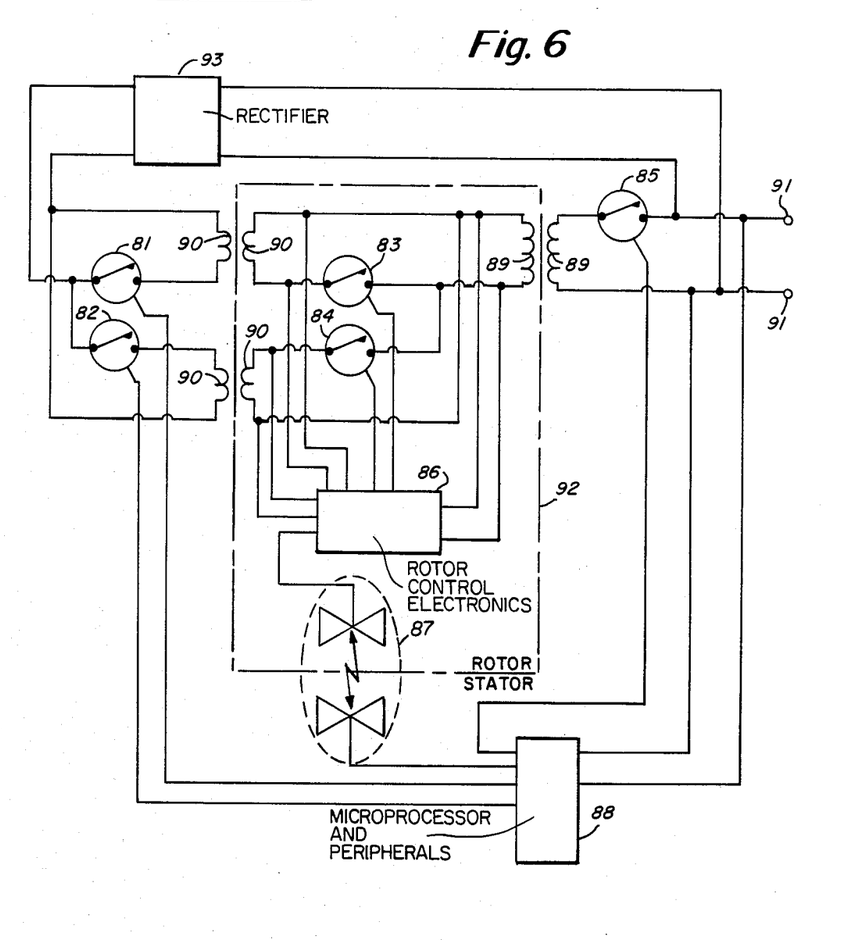
FIG. 6 portrays a more electrically detailed schematic of one phase of a possible multiphase electric machine in accordance with this invention.

FIG. 6 shows in more electrical detail a single phase of a multiple phase electric machine of this invention. Shown are the electronic switches 81, 82, 83, 84, 85, the rotor control electronics 86, the transducer communication system 87, the microprocessor system and peripheral electronics 88, the PGM windings 89, the REG windings 90, the optional rectifier 93, and the input terminals 91. The rotor is partitioned from the stationary parts of the electric machine by a dotted line box 92. Electronic switches 81 and 82 represent an arrangement of power semiconductors such as Bipolar transistors or field effect transistors. The microprocessor system and peripheral controls 88 control the rate, sequence, and time of the on/off states of electronic switches 81, 82 after analyzing the signal at the input terminals 91. This results in a modulated high frequency alternating flux in the rotor windings of the REG 90. Electronic switches 83 and 84 represent an arrangement of power semiconductors such as bipolar transistors or field effect transistors. The rotor controller electronics 86 controls the sequence, rate, and time of the on/off states of the electronic switches 83, 84 in order to demodulate the modulated high frequency alternating signal from the REG rotor windings 90. This demodulated signal then drives the PGM rotor windings 89 with the low frequency modulation ($w_{r(REG)}$). The rotor controller electronics could have the intelligence to determine the necessary sequence, rate, and time of the on/off states of the switches 83, 84 or alternatively, the microprocessor system and peripheral controller 88 could supply this information via the transducer communication system 87. In conjunction with measuring the rotor voltages, the rotor controller electronics 86 would supply the rotor voltage information to the microprocessor system 88 via the transducer communication system 87. When all events are properly synchronized, the optional electronic switch 85 would be turned on by the microprocessor system 88 for electric machine operation. The rotor controller electronics are powered by the rotor REG windings by conventional methods or alternatively, the communication transducer system if an magnetic transducer (electrical transformer) system was used. The microprocessor system and peripheral control electronics are powered by the input signal at the terminals of the electric machine. It should be understood that FIG. 6 is a very concise electronic design portrayal. There are numerous electronic designs which can accomplish the principles of FIG. 6, so no attempt has been made to precisely design the electronics of the electric motion machine invention.

Upon analyzing equ. 28, it is evident that all terms containing ($w_r$) will vary in magnitude due to the rotor mechanical motion ($w_r = w_s +/- w_m$). All terms containing ($w_1$) will essentially remain fixed ($w_1 >> w_m$) with mechanical movement.

When $w_m = 0$, then $w_r = w_s$ and when $w_m = w_s$, then $w_r = 0$. If $w_m >> w_s$, then $w_r$ reverses direction and increases proportionally with $w_m$. Likewise, all those terms in equ. 28 containing $w_r$ will vary proportionally with $w_r$. To compensate for this variation, thus keeping all terms at similar proportions, the driving electronics of the REG could change the carrier frequency ($w_1$) or the amplitude of the modulation ($I_{s(REG)}$).

The larger the variation of $w_r$ or speed of the axle desired, the larger the current variations or voltage variations of the rotor terms in equ. 28. Although high power electronic semiconductors, such as those used in the REG demodulator, are evolving into ever more stressful technology, the need for more and more versatility in the characteristics of this electric machine could surpass the stress ratings of the existing semiconductors.

There is an alternative which is in accordance with this invention. Reference is now made to FIG. 3. If one considers an REG high power subassembly to be one REG modulator and high frequency electronics group 3, one REG stator phase winding 6, one REG rotor phase winding 10, and one REG demodulator 12, then there are two REG high power subassemblies in FIG. 3 or one subassembly for each REG phase.

By multiplying the number of REG high power subassemblies per phase and connecting the inputs 1 of each subassembly of a phase in parallel or in series depending on the application, lower rated high power semiconductors could be used in the modulator and high frequency electronics. Likewise, by connecting the outputs of each subassembly of a phase in parallel or in series depending on the application, lower power semiconductors could be used in the demodulator section. A higher voltage or a higher current application would warrant the type of connection (parallel or series) and because the input of the subassembly was connected in series, let say, does not mean the output of the subassembly would be connected in series too. It is also conceivable to switch on or off each subassembly depending on the power demand of the electric machine.

The placement of each subassembly could be on the same REG rotary transformer core assembly so each phase winding on the REG would have additional phase windings per additional subassembly. It is also possible to have additional subassemblies on a separator REG rotary transformer core to keep the flux density of each REG core lower. In this case the electric machine would have multiple REG assemblies on the axial.

The electric machine of this invention will also run on direct current or D.C. All that is required is to modulate the high frequency signal exciting the stator windings of the REG with the same frequency of the signal exciting the stator windings of the PGM; thus keepin consistent with the criteria of this invention. This frequency of modulation is zero hertz or D.C. By varying the phase or amplitude of modulation of the high frequency signal exciting the stator windings of the REG, the relative phase of the magnetic field developed on the PGM rotor to the PGM stator will be varied.

Now in accordance to this invention and tantamount to supplying D.C. to the stator windings of the PGM, the PGM stator windings can be replaced with permanent magnets. Obviously with this arrangement, the PGM cannot supply electrical power to the grid via the PGM stator windings when generating however, generating features can be accomplished by channeling this electrical power back through the REG. This would require a similar circuit arrangement as presently described for the REG but only reversed; namely, the modulator (rather than the demodulator) would be placed between the PGM rotor windings and REG rotor windings and the demodulator (rather than the modulator) would be placed on the stator side of the REG. The modulator would generate a high frequency carrier signal modulated by the rotor electrical frequency ($w_s - w_m = w_r$), the direction of power propagation would be from rotor to stator of the REG, and the demodulator would generate a signal whose frequency is equal to the frequency seen at the PGM stator ($w_s - w_m = w_r$) or D.C.

A more refined method in accordance with this invention would be to place a modulator/demodulator circuit on both sides of the REG stator and rotor windings; thus, taking the place of the distinctive modulator and distinctive demodulator. With the proper microprocessor controls, bidirectional power flow through the REG is possible and as a result both motor and generator functions would be possible.

Still another method would be to transfer this generated electrical power of the PGM rotor via an electrical field transformer as discussed earlier and bypass the REG completely. Likewise, a modulator/demodulator circuit on both sides of the REG stator and rotor windings could be used for any arrangement of this invention; whether D.C. or A.C. is used or whether permanent magnets are used. This would allow the versatility of bidirectional power flow through the REG of this motor invention.

Now in accordance with this invention, the permanent magnet machine just discussed could be represented by FIG. 3A which differs from FIG. 3 by replacing the stator windings (16) and (17) of the power motor/generator with an arrangement of permanent magnets represented by (100) and (101), respectively. As a result, the phase excitation signals (1) and (2) would not be required. Because of the schematical representation of FIG. 3A, the orientation of the permanent magnets (100) and (101) is arbitrary.

In summary, by the way of its electromagnetic/electronic mechanism, the REG and support electronics acts as a brushless commutator for the PGM. For any rotational speed of the axle (Wn), the rotor excitation generator section consistently supplies a frequency to the rotor of the power motor/generator section equal to ($w_{sREG} - w_n$), and if the frequency of modulation supplied to the stator of the motor excitation generator section ($w_{sREG}$) is equal to the A.C. frequency supplied to the stator of the power motor/generator section ($w_{sPGM}$), then synchronous operation results for any rotational speed of the axial.

By supplying the rotor excitation generator with a modulated high frequency power source, the torque of the rotating machine in accordance with the invention is chiefly due to the power motor/generator. Also, the physical size of the machine is dependent primarily upon the requirements for the power motor/generator.

In accordance with the invention, the various type of modulation supplied to the machine control the axle rotational speed, and axle torque, the axial displacement, and the electrical power factor. This modulation control may be by controlling the phase of the modulation, the frequency of the modulation or the amplitude of the modulation. Likewise, the phase, frequency and amplitude parameters of modulation control the switching between the motor or generator modes, the electrical power when in the motor or generator mode, and the operational frequency of the motor or generator. Also, when generating, the A.C. output can be easily synchronized to the electrical utility power network.

The production and control of the high frequency modulated signal supplied to the rotor excitation generator, as well as the monitoring of the motor or generator parameters, readily lends itself to the use of electric power semiconductors and an electronic microprocessor.

For a given horsepower rating, half of the electrical power at a maximum, passes through the rotor excitation generator to the rotor of the power motor/generator, and the remainder of the electrical power is supplied to the stator of the power motor/generator. Therefore, semiconductors of less than half the electrical power rating can be used compared to a conventional electronic motor controller which controls conventional A.C. induction or synchronous motor.

Moreover, it is preferred in accordance with the invention, as illustrated in FIG. 3 that the electrical and physical size of the REG windings are smaller than the PGM windings. Because of the smaller electrical size of the REG windings, a higher frequency source is supplied to the REG and the torque of the REG is smaller than that of the PGM. The high frequency pulses supplied to the REG limit the power dissipated by the semiconductors and thus increase their efficiency. Also, with the use of fast switching semiconductors, control of the currents and voltages supplied to the REG can be precisely controlled. Also, the REG is very compact in comparison to the PGM.

As indicated previously, the concepts of the present invention, although previously explained in connection with electric rotational machines, also apply to electic linear machines. Because of the linear orientation of motion, the use of linear electric machines may apply in areas where a rotation electric machine is not desirable. Some areas particularly useful for electric linear machines are electric transportation systems and disk head positioning drives for magnetic storage devices used in the computer industry.

With regard to induction rotating machines, the multi phase windings of the stator of these machines produces a rotating magnetic field whose rotational frequency is directly related to the excitation frequency of the stator windings and whose rotational direction is related to the polarity of the excitation of the stator windings. If there is a difference between the rotational frequency of this magnetic field and the mechanical rotational frequency of the rotor windings (referred to as "slip"), a current and a resulting rotating magnetic field is induced into the windings of the rotor (Faraday's Law) and a mechanical torque results (Lorentz's Relation) to eleviate this field (Lenz's Law); hence, an induction electric rotating machine. The rotor windings of an induction machine can be truly electrically wired windings or a non insulator material such as a metal plate where currents can be induced.

An induction electric rotating machine has slip to generate a rotational magnetic field in the rotor and as a result mechanical torque. When an induction machine rotates at synchronous speed or at the speed equal to the stator's rotating magnetic field there is no field induced into the rotor windings and hence no torque.

The aforementioned principles of electric induction rotating machines also hold true if both the stator and rotor are rolled out flat along their perimeters or along the air gap between the rotor or stator. Instead of a rotating magnetic field whose angular velocity is related to the excitation frequency, a linear traveling magnetic field whose linear velocity is related to the excitation frequency results in the stator of the linear machine; likewise, if there is slip between the flat rotor's traveling magnetic field and the windings of the flat rotor, a force results due to the principles of Faraday's Law, Lenz's Law and Lorentz's Relation. Hence, an electric linear machine.

Analagous to the induction machine, the conventional synchronous electric rotating machine establishes the same rotating magnetic field in its stator as the induction electric rotating machine. Contrary to the rotor of the induction machine, the rotor of the synchronous machine has an established magnetic field whose orientation is fixed with time when referenced to the axis of the rotor but when referenced to the axis of the stator this magnetic field rotates at the mechanical angular frequency of the rotor. The rotating magnetic field of this rotor and the rotating magnetic field of the stator are synchronized; namely, the rotor is mechanically rotating at the same frequency as the magnetic field of the stator. Only by changing the phase angle between these two rotating fields can the impedance of the stator be changed, causing more or less current to flow in the stator windings; hence torque develops.

Just as the principles of rotating magnetic fields for the induction electric rotating machine can be adapted to the induction electric linear machine, so can the rotating magnetic fields of the synchronous motor.

The rotor and stator of the synchronous rotating machine can be rolled out flat along their perimeter or the air gap. Since the stator windings of the synchronous machine is analagous to the induction machine, the same traveling magnetic field as discussed for the linear induction motor results. In contrast to the linear induction machine, the rotor of the linear synchronous machine is traveling at the same velocity as the magnetic field of the stator to satisfy the principles of synchronous operation. The phase angle between the synchronous magnetic fields of the rotor and stator are non-zero to generate force.

It must be emphasized that a synchronous electric machine whether linear or rotational has no starting force but does have force at synchronous speed. In contrast, an induction electric machine has starting force but no force at synchronous speed. It is for this reason that present linear electric machines are generally induction machines.

In accordance with the present invention the principles allow the electric rotating machine to appear to be a synchronous rotating machine at any rotational speed of the rotor; hence, the rotating fields of both the stator and rotor are generally synchronized and a force results by controlling the phase of the fields.

In summary, and with regard to the drawings described herein, a set of rotor excitation generator windings and a set of power generator motor windings on the rotor (common axle) and a set of PGM and REG windings on the stator are disposed. The REG windings has a smaller inductance and mutual inductance than the PGM windings because the REG windings are excited with a modulated high frequency power signal. The modulation frequency equals the PGM stator power signal frequency.

The characteristics of this arrangement is such that the rotating magnetic fields of both the stator and rotors are always synchronized at any mechanical rotation of the axle. As a result mechanical force can be generated at any rotational speed of the axle, whether the axle is stationary or whether the axle is rotating at synchronous speed.

Similarly, as previously discussed for the conventional induction machine, and the conventional synchronous machine, both the rotor and stator of the present invention can be rolled out flat along their perimeter or air gap and their magnetic fields will travel at a linear velocity related to the excitation frequency. Lorentz's Relation, Faraday's Law and Lenz's Law still apply and a force results if the fields are out of phase. In contrast to the synchronous machine, the flat rotor of the invention herein will not have to travel at synchronous speed because the resulting magnetic field of the flat rotor appears to be traveling at synchronous speed due to its novel excitation and winding arrangement.

What is claimed is:
1. An electric machine comprising;
a first electric machine having at least one stationary winding and associated moving winding,
a second electric machine having at least one stationary winding and associated moving winding,
both said first and second electric machines having a common carrier so as to provide motion at the same velocity,
said common carrier comprising a moving common carrier and a stationary common carrier,
means coupling the moving winding of the first electric machine to the moving winding of the second electric machine whereby the moving winding of the second electric machine is excited from the first machine,
means coupling a first frequency signal to the stationary winding of the first electric machine,
means coupling a second frequency signal to the stationary winding of the second electric machine,
means for communicating electrical signals between the moving common carrier and the stationary common carrier,
whereby synchronous overall operation occurs for any moving speed of the axial,
said means for communicating including a communication transducer system including a moving mem- ber associated with either rotor and a stationary member associated with the corresponding stator, said first frequency being substantially greater than said second frequency whereby the torque of the machine is chiefly dependent on the second electric machine, said first frequency coupling means comprising modulating means for receiving a third frequency signal substantially the same as said second frequency signal and continuously modulating said first frequency by said third frequency, said first electric machine having windings which are physically and electrically smaller than those of said second electric machine whereby the physical size of the overall machine is dependent primarily upon the second electric machine.

2. An electric apparatus as set forth in claim 1 wherein said electric machines both have a pair of stator windings and associated rotor windings for two phase operation.

3. An electric apparatus as set forth in claim 2 wherein said first frequency coupling means comprises modulating means.

4. An electric apparatus as set forth in claim 1 wherein said modulation is one of phase, amplitude, pulse width, or frequency modulation.

5. An electric apparatus as set forth in claim 4 wherein said means coupling the moving winding of the first machine to the moving winding of the second machine comprises a demodulating means.

6. An electric apparatus as set forth in claim 1 wherein said means coupling the moving winding of the first machine to the moving winding of the second machine comprises only the electro-mechanical demodulating means of the physical rotor.

7. An electric apparatus as set forth in claim 1 wherein both said first and second electric machines have a predetermined number of stationary windings and associated moving windings to satisfy multiphase operation including one winding per phase.

8. An electric apparatus as set forth in claim 1 wherein said means coupling the moving winding of the first electric machine to the moving winding of the second electric machine comprises a demodulating means.

9. An electric apparatus as set forth in claim 8 wherein said demodulating means comprises an electronic synchronous demodulator.

10. An electric apparatus as set forth in claim 1 wherein said means for communicating is monodirectional.

11. An electric apparatus as set forth in claim 1 wherein said means for communicating is bi-directional.

12. An electric apparatus as set forth in claim 1 wherein the means for communicating between the moving common carrier and the stationary common carrier is without physical contact and includes means defining one of an electric field, a magnetic field, an electro-magnetic field and a light field.

13. An electric apparatus as set forth in claim 12 wherein the coupling fields are modulated with said information.

14. An electric apparatus as set forth in claim 1 wherein said means for communicating includes a field converting means comprising an electric-to-field transducer or a field-to-electrical transducer.

15. An electric apparatus as set forth in claim 14 wherein said field converting means comprises a modulator/demodulator.

16. An electric machine as set forth in claim 1 wherein said means coupling a first frequency signal to the stationary windings of the first electric machine comprises an electronic demodulator.

17. An electric machine as set forth in claim 16 wherein the output of said electronic demodulator has multiple phase signals corresponding to the number of phase windings including at least one phase.

18. An electric machine as set forth in claim 1 wherein said means coupling the moving windings of the first electric machine to the moving windings of the second electric machine comprises an electronic modulator.

19. An electric machine as set forth in claim 18 wherein the output of said electronic modulator has multiple phase signals corresponding to the number of phase windings.

20. An electric machine as set forth in claim 1 wherein the motion is rotational.

21. An electric machine as set forth in claim 1 wherein the motion is linear.

22. An electric machine as set forth in claim 1 wherein said means copupling a first frequency signal to the stationary windings of the first electric machine comprises an electronic modulator.

23. An electric apparatus comprising;

a first electric machine having at least one stator winding and associated moving winding, a second electric machine having at least one permanent magnet and associated moving winding, both said first and second electric machine having a common axial so as to provide rotation at the same angular velocity, means coupling the moving winding of the first electric machine to the moving winding of the second electric machine, means coupling a first frequency signal to the stator winding of the first electric machine, means for communicating parametric information or propagating electrical energy between either moving winding and stator winding without physical contact, whereby synchronous overall operation occurs for any velocity of the common carrier, said first frequency being substantially greater than said second frequency whereby the force of the machine is chiefly dependent upon the second electric machine, said first frequency coupling means comprising modulating means for receiving a third frequency signal substantially the same as zero frequency or D.C. and continuously modulating said first frequency by said third frequency, said first electric machine having windings which are physically and electrically smaller than those of the second electric machine whereby the physical size of the overall machine is dependent primarily upon the second electric machine.

24. An electric machine as set forth in claim 23 wherein said means coupling a first frequency signal to the stationary windings of the first electric machine comprises an electronic demodulator.

25. An electric machine as set forth in claim 24 wherein the output of said electronic demodulator has multiple phase signals corresponding to the number of phase windings including at least one phase.

26. An electric machine as set forth in claim 23 wherein said means coupling the moving windings of the first electric machine to the moving windings of the second electric machine comprises an electronic modulator.

27. An electric machine as set forth in claim 26 wherein the output of said electronic modulator has multiple phase signals corresponding to the number of phase windings.

28. An electric machine as set forth in claim 23 wherein the motion is rotational.

29. An electric machine as set forth in claim 23 wherein the motion is linear.

30. An electric machine as set forth in claim 23 wherein both said first and second electric machines have a predetermined number of stationary windings and associated moving windings to satisfy multiphase operation including at least one winding per phase.

31. An electric machine as set forth in claim 30 wherein said third frequency of modulation comprises multiple phase signals corresponding to the number of phase windings.

32. An electric machine as set forth in claim 23 wherein said modulation is at least one of phase, amplitude, pulse width, or frequency modulation.

33. An electric machine as set forth in claim 23 wherein said means coupling the moving windings of the first electric machine to the moving windings of the second electric machine comprises an electronic demodulating means.

34. An electric machine as set forth in claim 33 wherein the resulting signals of the demodulating means is multiphased including at least one phase.

35. An electric machine as set forth in claim 23 wherein said means coupling the moving windings of the first electric machine to the moving windings of the second electric machine comprises only the electromechanical demodulating means of the physical electric apparatus.

36. An electric machine as set forth in claim 23 wherein said means for communication is monodirectional or bidirectional.

37. An electric machine as set forth in claim 35 wherein said means for communication comprises a modulator or demodulator or both.

38. An electric machine as set forth in claim 36 wherein said communication between the moving common carrier and the stationary common carrier is without physical contact and includes the transduction of the process information to one of an electric field, a magnetic field, an electro-magnetic field, and a light field.

39. An electric machine as set forth in claim 23 wherein the stationary windings of said second electric machine are replaced with at least one permanent magnet.

40. An electric machine as set forth in claim 23 wherein said means coupling a first frequency signal to the stationary windings of the first electric machine comprises an electronic modulator.

41. An electric apparatus comprising;
a first electric machine having at least one stationary winding and associated moving winding,
a second electric machine having at least one stationary winding and associated moving winding,
both said moving windings of the first and second electric machines have a common carrier so as to provide motion at the same velocity,
means coupling the moving windings of the first electric machine to the moving windings of the second electric machine,
means coupling a first frequency signal to the stationary windings of the first electric machine,
means coupling a second frequency signal to the stationary windings of the second electric machine,
means for communicating process information between the moving common carrier and the stationary carrier,
whereby synchronous overall operation occurs for any velocity of the common carrier,
said first frequency being substantially greater than said second frequency whereby the torque or force of the machine is chiefly dependent on the second electric machine, and
said first frequency coupling means comprising modulating means for receiving a third frequency signal substantially the same as said second frequency signal and continuously modulating said first frequency by said third frequency,
said first electric machine having windings which are physically and electrically smaller than those of the second electric machine whereby the physical size of the overall machine is dependent primarily upon the second electric machine.

42. An electric machine as set forth in claim 41 wherein both said first and second electric machines have a predetermined number of stationary windings and associated moving windings to satisfy multiphase operation including at least one winding per phase.

43. An electric machine as set forth in claim 42 wherein said third frequency of modulation comprises multiple phase signals corresponding to the number of phase windings.

44. An electric machine as set forth in claim 41 wherein said modulation is at least one of phase, amplitude, pulse width, or frequency modulation.

45. An electric machine as set forth in claim 41 wherein said means coupling the moving windings of the first electric machine to the moving windings of the second electric machine comprises an electronic demodulating means.

46. An electric machine as set forth in claim 45 wherein the resulting signals of the demodulating means is multiphased including at least one phase.

47. An electric machine as set forth in claim 41 wherein said means coupling the moving windings of the first electric machine to the moving windings of the second electric machine comprises only the electromechanical demodulating means of the physical electric apparatus.

48. An electric machine as set forth in claim 41 wherein said means for communication is monodirectional or bidirectional.

49. An electric machine as set forth in claim 48 wherein said means for communication comprises a modulator or demodulator or both.

50. An electric machine as set forth in claim 49 wherein said communication between the moving common carrier and the stationary common carrier is without physical contact and includes the transduction of the process information to one of an electric field, a magnetic field, an electro-magnetic field, and a light field.

51. An electric machine as set forth in claim 41 wherein the stationary windings of said second electric machine are replaced with at least one permanent magnet.

52. An electric machine as set forth in claim 41 wherein said second frequency signal is not applicable and said third frequency signal is zero.

53. An electric machine as set forth in claim 41 wherein said means coupling a first frequency signal to the stationary windings of the first electric machine comprises an electronic demodulator.

54. An electric machine as set forth in claim 53 wherein the output of said electronic demodulator is a multi-phase signal including at least one phase.

55. An electric machine as set forth in claim 41 wherein said means coupling the moving windings of the first electric machine to the moving windings of the second electric machine comprises an electronic modulator.

56. An electric machine as set forth in claim 55 wherein said electronic modulator has multiple phase signals corresponding to the number of phase windings.

57. An electric machine as set forth in claim 41 wherein said means coupling a first frequency signal to the stationary windings of the first electric machine comprises an electronic demodulator.

58. An electric machine as set forth in claim 57 wherein the output of said electronic demodulator has multiple phase signals corresponding to the number of phase windings including at least one phase.

59. An electric machine as set forth in claim 41 wherein said means coupling the moving windings of the first electric machine to the moving windings of the second electric machine comprises an electronic modulator.

60. An electric machine as set forth in claim 59 wherein the output of said electronic modulator has multiple phase signals corresponding to the number of phase windings.

61. An electric machine as set forth in claim 41 wherein the motion is rotational.

62. An electric machine as set forth in claim 41 wherein the motion is linear.

63. An electric machine as set forth in claim 41 wherein said means coupling a first frequency signal to the stationary windings of the first electric machine comprises an electronic modulator.

64. An electric rotating machine comprising;
 a first electric rotating means having at least one stator winding and associated rotor winding,
 a second electric rotating means having at least one stator winding and associated rotor winding,
 both said first and second electric rotating means having a common axial so as to provide rotation at the same angular velocity,
 means coupling the rotor winding of the first electric rotating means to the rotor winding of the second electric rotating means,
 means coupling a first frequency signal to the stator winding of the first electric rotating means,
 means coupling a second frequency signal to the stator winding of the second electric rotating means,
 whereby synchronous overall operation occurs for any rotational speed of the axial,
 said first frequency being substantially greater than said second freqency whereby the torque of the machine is chiefly dependent on the second electric rotating means,
 said first frequency coupling means comprising modulating means for receiving a third frequency signal substantially the same as said second frequency signal and continuously modulating said first frequency by said third frequency,
 said first electric rotating means having windings which are physically and electrically smaller than those of the second electric rotating means whereby the physical size of the overall machine is dependent primarily upon the second electric rotating means.

65. An electric machine as set forth in claim 64 wherein said means coupling a first frequency signal to the stationary windings of the first electric machine comprises an electronic modulator.

66. An electric apparatus comprising;
 a first electric machine having at least one stationary winding and associated moving winding,
 a second electric machine having at least one stationary winding and associated moving winding,
 both said first and second electric machines having a common carrier so as to provide motion at the same linear velocity,
 means coupling the moving winding of the first electric machine to the moving winding of the second electric machine,
 means coupling a first frequency signal to the stationary winding of the first electric machine,
 means coupling a second frequency signal to the stationary winding of the second electric machine,
 whereby synchronous overall operation occurs for any moving speed of the carrier,
 said first frequency being substantially greater than said second frequency whereby the torque or force of the machine is chiefly dependent on the second electric machine,
 said first frequency coupling means comprising modulating means for receiving a third frequency signal substantially the same as said second frequency signal and continuously modulating said first frequency by said third frequency,
 said first electric machine having windings which are physically and electrically smaller than those of said second electric machine whereby the physical size of the overall machine is dependent primarily upon the second electric machine.

67. An electric machine as set forth in claim 66 wherein said means coupling a first frequency signal to the stationary windings of the first electric machine comprises an electronic demodulator.

68. An electric machine as set forth in claim 67 wherein the output of said electronic demodulator has multiple phase signals corresponding to the number of phase windings including at least one phase.

69. An electric machine as set forth in claim 66 wherein said means coupling the moving windings of the first electric machine to the moving windings of the second electric machine comprises an electronic modulator.

70. An electric machine as set forth in claim 69 wherein the output of said electronic demodulator has multiple phase signals corresponding to the number of phase windings.

71. An electric machine as set forth in claim 66 wherein the motion is rotational.

72. An electric machine as set forth in claim 66 wherein the motion is linear.

73. An electric machine as set forth in claim 66 wherein both said first and second electric machines have a predetermined number of stationary windings and associated moving windings to satisfy multiphase operation including at least one winding per phase.

74. An electric machine as set forth in claim 73 wherein said third frequency of modulation comprises multiple phase signals corresponding to the number of phase windings.

75. An electric machine as set forth in claim 66 wherein said modulation is at least one of phase, amplitude, pulse width, or frequency modulation.

76. An electric machine as set forth in claim 66 wherein said means coupling the moving windings of the first electric machine to the moving windings of the second electric machine comprises an electronic demodulating means.

77. An electric machine as set forth in claim 76 wherein the resulting signals of the demodulating means is multiphased including at least one phase.

78. An electric machine as set forth in claim 66 wherein said means coupling the moving windings of the first electric machine to the moving windings of the second electric machine comprises only the electromechanical demodulating means of the physical electric apparatus.

79. An electric machine as set forth in claim 66 wherein the stationary windings of said second electric machine are replaced with at least one permanent magnet.

80. An electric machine as set forth in claim 66 wherein said second frequency signal is not applicable and said third frequency signal is zero.

81. An electric machine as set forth in claim 66 wherein said means coupling a first frequency signal to the stationary windings of the first electric machine comprises an electronic modulator.

* * * * *